US008683038B2

United States Patent
Chen et al.

(10) Patent No.: US 8,683,038 B2
(45) Date of Patent: *Mar. 25, 2014

(54) SYSTEM AND METHOD FOR QUARANTINING IP SERVICE DEVICES

(75) Inventors: John Anthony Chen, Broadlands, VA (US); Kenneth Gould, Oakton, VA (US); Christopher R. Roosenraad, Herndon, VA (US); Geoff Filippi, Ashburn, VA (US)

(73) Assignee: Time Warner Cable Inc., New York, NY (US)

( * ) Notice: Subject to any disclaimer, the term of this patent is extended or adjusted under 35 U.S.C. 154(b) by 551 days.

This patent is subject to a terminal disclaimer.

(21) Appl. No.: 12/692,957

(22) Filed: Jan. 25, 2010

(65) Prior Publication Data

US 2011/0185061 A1 Jul. 28, 2011

(51) Int. Cl.
*G06F 15/173* (2006.01)
*G06F 15/16* (2006.01)

(52) U.S. Cl.
USPC ............................................ 709/225; 709/227

(58) Field of Classification Search
None
See application file for complete search history.

(56) References Cited

U.S. PATENT DOCUMENTS

| | | | |
|---|---|---|---|
| 2004/0123329 A1* | 6/2004 | Williams et al. | 725/111 |
| 2005/0055708 A1* | 3/2005 | Gould et al. | 725/25 |
| 2005/0114880 A1* | 5/2005 | Gould | 725/25 |
| 2006/0130139 A1* | 6/2006 | Sobel et al. | 726/22 |
| 2008/0109864 A1* | 5/2008 | Danforth et al. | 725/111 |
| 2009/0288145 A1* | 11/2009 | Huber et al. | 726/3 |
| 2010/0287585 A1* | 11/2010 | Frondal et al. | 725/31 |
| 2011/0107436 A1* | 5/2011 | Cholas et al. | 726/29 |

* cited by examiner

*Primary Examiner* — Peling Shaw
(74) *Attorney, Agent, or Firm* — The Marbury Law Group, PLLC

(57) ABSTRACT

A system and method for quarantining IP service devices (ISDs). When an ISD is placed into a quarantined environment, any request from the ISD will be re-directed to a quarantine alert server in a quarantine sub-system. In response to the request, the quarantine alert server may provide the user with information about the quarantine and may redirect, or instruct the user to redirect, the request to a quarantine response server. The quarantine response server may provide additional information that is not in the quarantine video message as to how the user may end the quarantine.

28 Claims, 6 Drawing Sheets

SYSTEM AND METHOD FOR QUARANTINING IP SERVICE DEVICES

BACKGROUND

Operation of a subscriber network requires not only facilities to establish communications but resources to manage the network. Individual subscribers represent both a business opportunity and, if abusing the network or their service commitments, a threat to the network. Managing subscribers and their use of the various network resources is therefore a way to maximize the financial return from the subscriber base and to protect the network. Examples of subscriber management activities include managing new activations, isolation and cleansing of virus-spreading subscribers, compelling subscribers to upgrade service-related software, isolating and managing a subscriber who is abusing the network or exceeding the service resources available to that subscriber, and offering a subscriber a new tier of service.

It is not unusual for a network operation to impose bandwidth limits, outbound limits on e-mail, and limits on DNS queries for example. Clearly, a subscriber network operator has an interest in minimizing the effects of viruses on its subscribers and preventing the spread of a virus from infected subscribers. Additionally, operators of subscriber networks are motivated to deny service to subscribers who may be abusing the network or who are not in compliance with the terms of their service agreements.

One approach to dealing with a subscriber who poses a physical or financial risk to the network is to quarantine all devices associated with that subscriber so as to limit the network access of devices to particular network locations where the subscriber may be presented with the reasons for the quarantine and the steps necessary to release the subscriber's network equipment from quarantine. For example, a quarantine may be applied to a cable modem (CM) via its IP and/or MAC addresses. All customer premise equipments (CPEs) behind the CM are placed in an isolated environment where any web-browser queries from the subscriber are directed to a "quarantine web server." This type of quarantine may be referred to as a "network" quarantine.

Systems and methods for affecting the behavior of a network device in a cable network are described in commonly owned U.S. Pat. No. 7,571,460 and divisional application Ser. No. 12/424,154, both of which are incorporated in their entireties for all purposes. As described therein, a subscriber access control system (SACS) is used to configure a network device connected to cable network and to affect the behavior of that device. The SACS comprises a rules server and a datastore that stores the current state of subscribers known to the SACS and historical request information. When the SACS receives a request to quarantine a device, the SACS obtains the MAC address and IP of the device to be quarantined, determines the quarantine "state" of the subscriber, and then assigns attributes to a subscriber record accessed by a DHCP server to affect the behavior of that device. The actual behavior of the quarantined device is determined by the presence of the attribute and the value of the attribute.

In addition to browser-equipped CPE, a CM may provide Internet access to a variety of devices that provide services that are not Web-based. By way of example, IP service devices (ISDs) may receive content using protocols and clients that are not routed through the Web. By way of illustration and not by way of limitation, an ISD may be an IP-STB, a cellphone, a laptop, or a general purpose computer configured to receive services using the Internet Protocol that are not Web-based. For example, IP-video may be provided to an ISD operating a client that communicates directly with a video content server. Digital voice services are typically provided to an ISD that communicates with a softswitch using the Internet Protocol and voice-specific protocols. Gaming services may also be provided using the Internet Protocol.

Because ISDs do not connect to the Web, the quarantining of a CM through which an ISD connects to the Internet may result in a disruption of service to the ISD without notice to the user of why the quarantine was imposed and how the quarantine may be lifted.

Services to ISDs may also be subject to subscriber agreements that are independent of agreements for other services. Circumstances may arise in which it is desirable to quarantine the ISD services without affecting other web-based services (e.g., e-mail, web browsing, and video downloads).

Circumstances may also arise in which a service provider desires to communicate with a user of an ISD without denying the user services via the ISD (sometimes referred to herein as a "soft quarantine"). For example, a user may be informed that his or her service agreement is about to expire, that a service may be interrupted for maintenance, that the terms of a service agreement have been changed or that the user needs to check with local authorities for an important message regarding public health, safety, or law enforcement.

SUMMARY

Embodiments herein provide systems and methods for quarantining Internet service devices (ISDs) and for informing users of ISDs when their devices are subject to quarantine.

In an embodiment, when an ISD is subject to quarantine, any request from the ISD will be re-directed to a quarantine alert server in a quarantine sub-system. In response to the request, the quarantine alert server may provide the user with information about the quarantine via a quarantine video message and may redirect, or instruct the user to redirect, the request to a quarantine response server. The quarantine response server may provide additional information that is not in the quarantine video message as to how the user may end the quarantine.

DETAILED DESCRIPTION

In an embodiment, when an ISD is placed into a quarantine environment, any request from the ISD will be re-directed to a quarantine alert server in a quarantine sub-system. In response to the request, the quarantine alert server may provide the user with information about the quarantine and may redirect, or instruct the user to redirect, the request to a quarantine response server. The quarantine response server may provide additional information that is not in the quarantine video message as to how the user may end the quarantine.

Figure 1:
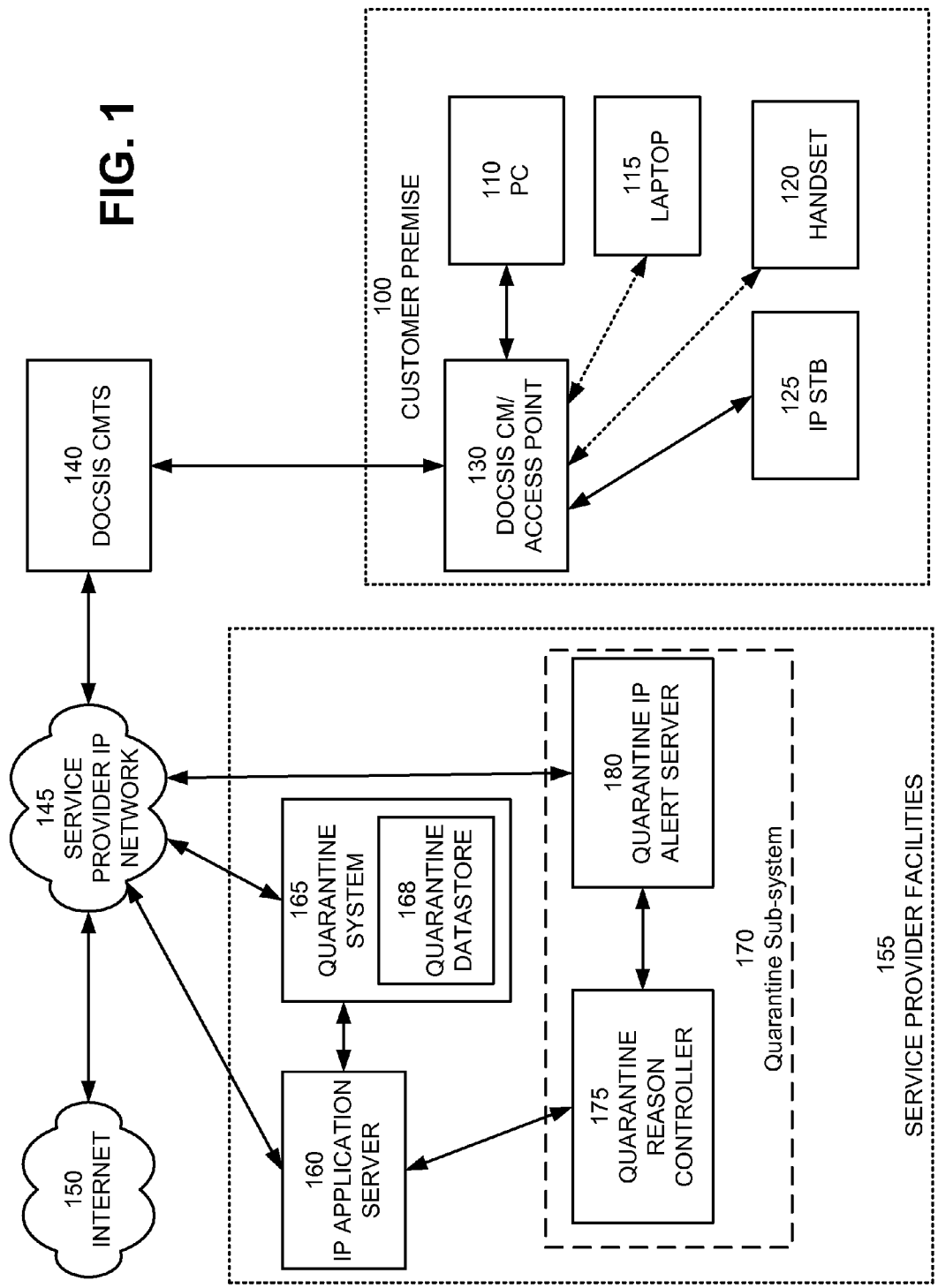
FIG. 1 is a block diagram illustrating elements of a system for managing network quarantine states using cable modem identifiers according to an embodiment.

FIG. 1 is a block diagram illustrating elements of a system for providing services to subscribers according to an embodiment. Packets are sent from and delivered to a customer's premises 100 via a DOCSIS cable modem termination system (CMTS) 140 through a service provider IP network 145 to the Internet 150. Packets may also be communicated from the customer premises 100 to an IP application server 160 located in facilities operated by the service provider 155. The service provider facilities 155 may also comprise a quarantine system 165 and a quarantine sub-system 170. The quarantine system 165 comprises a quarantine datastore 168. The quarantine datastore 168 maintains a log of network devices that have been quarantined.

The customer premises 100 may comprise a DOCSIS cable modem 130. As illustrated in FIG. 1, the DOCSIS cable modem 130 provides a wireless network access point. In an embodiment, the wireless access point may be configured to receive Wi-Fi signals, Bluetooth signals, and/or other wireless protocols. The customer premises 100 may further comprise a PC 110, a laptop 115, a handset 120, and an IP STB 125. As illustrated, the laptop 115 and the handset 120 communicate with the DOCSIS CM/AP 130 via a wireless protocol. However, any one of the connections between the DOCSIS CM/AP 130 and the PC 110, the laptop 115, a handset 120, and the IP STB 125 may communicate with the DOCSIS CM/AP 130 using a wireless or wired protocol. In an embodiment, the PC 110, the laptop 115, a handset 120, and the IP STB 125 are configured to receive services using the Internet Protocol that are not Web-based (such devices and similarly configured devices sometimes collectively referred to herein as "Internet service devices" or ISDs).

The quarantine sub-system 170 may include a quarantine reason controller 175 and a quarantine IP alert server 180.

Figure 2:
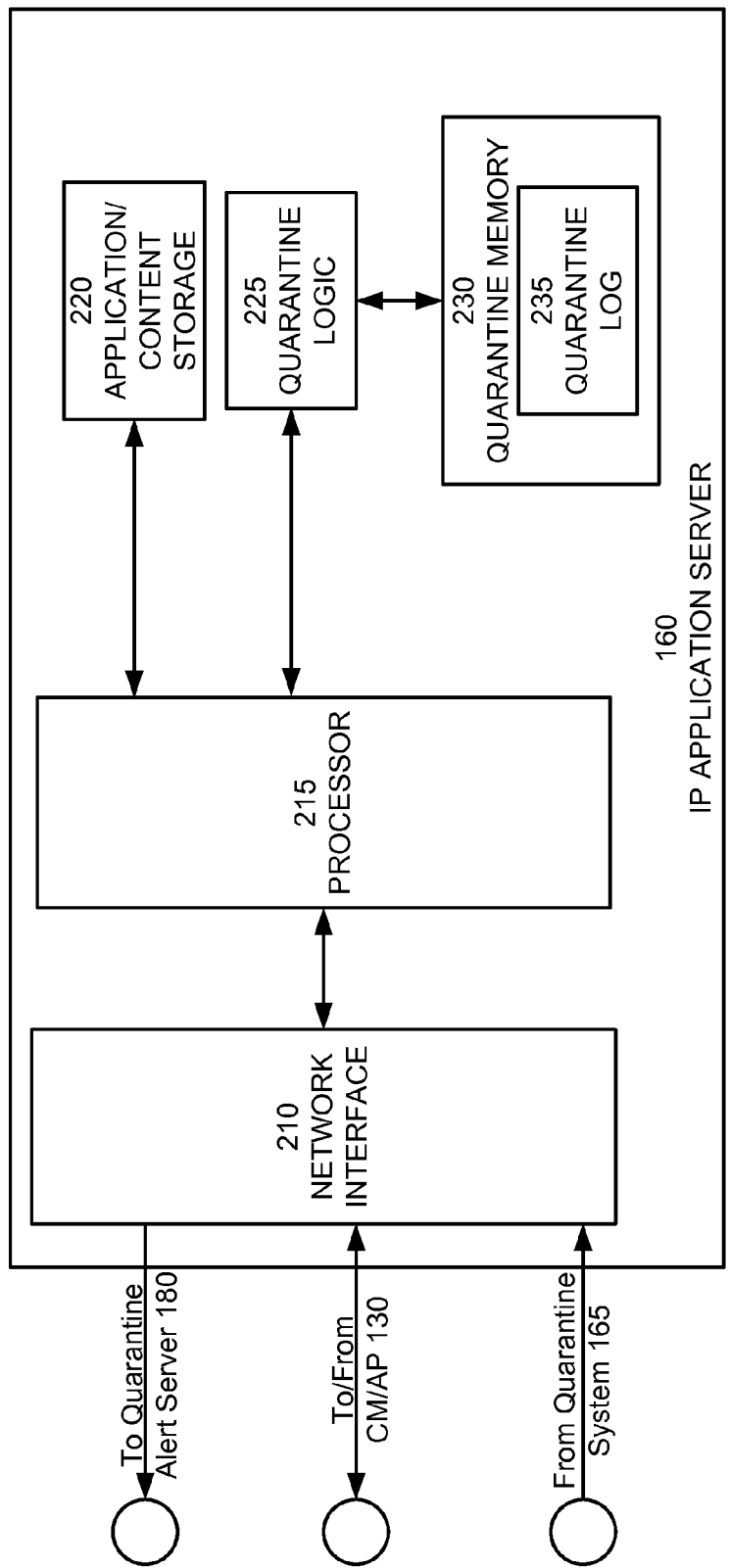
FIG. 2 is a block diagram illustrating components of an IP application server according to an embodiment.

FIG. 2 is a block diagram illustrating components of an IP application server according to an embodiment.

The IP application server 160 comprises a network interface 210, a processor 215, an application storage component 220, quarantine logic 225 and a quarantine memory 230. The application storage component comprises the applications run by the IP applications server 160 and the content that is served by IP applications server 160. The quarantine memory 230 comprises a quarantine log 235 that stores quarantine data indicative of whether a particular DOCSIS CM/AP 130 is subject to quarantine.

Figure 3:
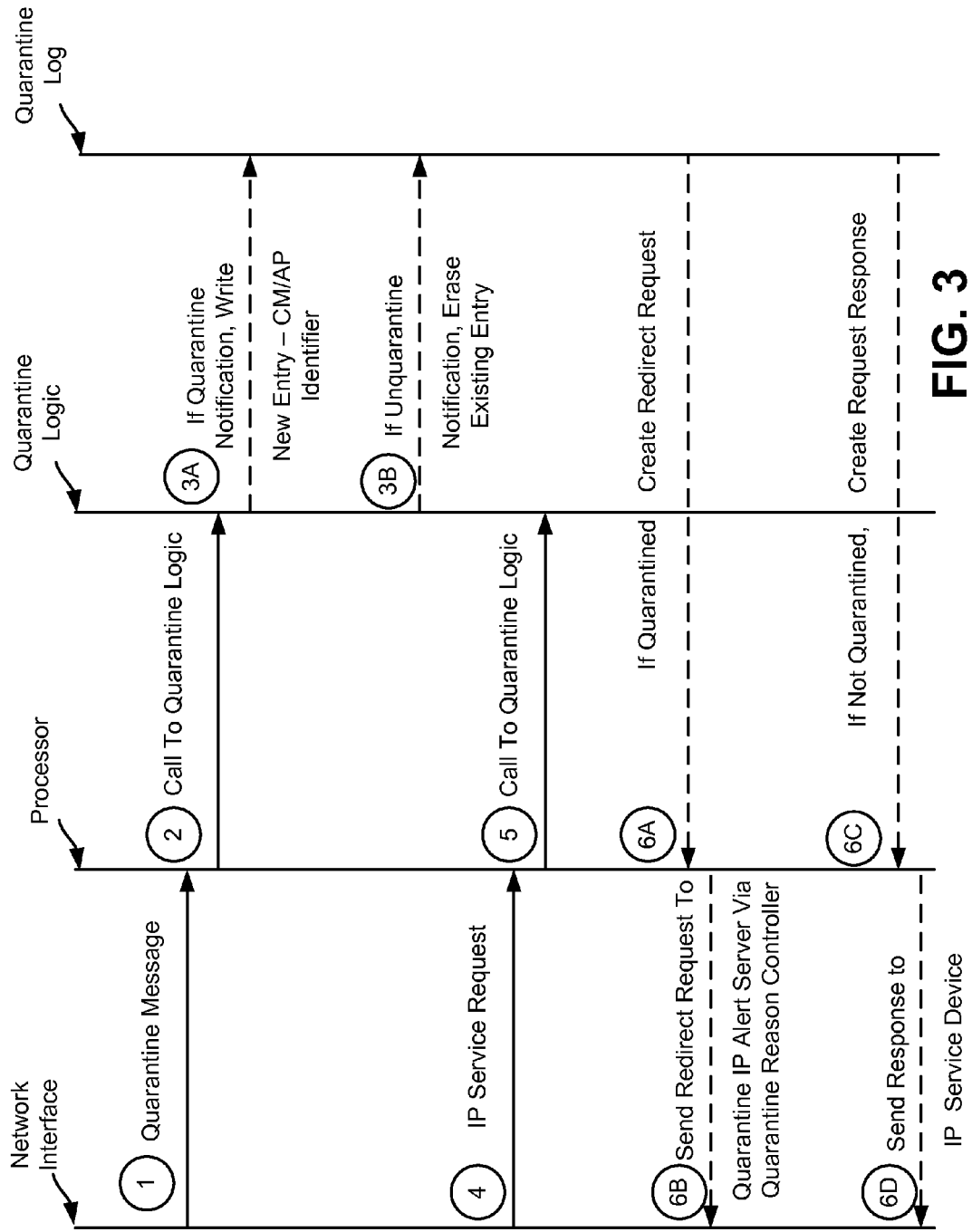
FIG. 3 is a flow diagram illustrating a process by which an IP application server may identify a DOCSIS CM/AP that is subject to quarantine according to an embodiment.

FIG. 3 is a flow diagram illustrating a process by which an IP application server may identify a DOCSIS CM/AP that is subject to quarantine according to an embodiment.

Referring to FIGS. 1, 2 and 3, in an embodiment, when the DOCSIS CM/AP 130 has been quarantined or unquarantined by the quarantine system 165, the quarantine system 165 sends a quarantine status message to the IP application server 160. (FIG. 3, circle 1.) The quarantine status message is received at the network interface 210 and referred to the processor 215. The receipt of the quarantine status message causes the IP application server 160 to make a call to quarantine logic 225. (FIG. 3, circle 2.) The quarantine status message may include an identifier associated with the DOCSIS CM/AP 130 that is the subject of the quarantine status message and a quarantine code.

If the quarantine status message is a quarantine notification, the quarantine logic causes a new entry to be written to quarantine log 235. (FIG. 3, circle 3A.) The new entry may include the DOCSIS CM/AP identifier and the quarantine code provided in the quarantine status message. By way of illustration and not by way of limitation, the identifier may be the MAC address of the DOCSIS CM/AP 130, the IP address of the DOCSIS CM/AP 130, or may include both.

If the quarantine status message is an unquarantine notification, the quarantine logic causes an existing entry associated with the DOCSIS CM/AP identifier conveyed by the quarantine status message to be erased. (FIG. 3, circle 3B.)

A cable modem (such as DOCSIS CM/AP 130) forwards an IP service request from an ISD to an IP application server 160. In an embodiment, the IP service request is received at the network interface 210 of IP application server 160 and is passed to the processor 215. (FIG. 3, circle 4.) The IP service request comprises an identifier that associates the subscriber to the DOCSIS CM/AP 130 that forwards the IP service request and an ISD identifier that identifies the ISD from which the request originated. By way of illustration and not by way of limitation, the DOCSIS CM/AP identifier may be the MAC address of the DOCSIS CM/AP 130, the IP address of the DOCSIS CM/AP 130, or may include both. The ISD identifier may be the MAC address of the ISD, the IP address of the ISD, or may include both.

The receipt of the IP service request causes the processor 215 to make a call to the quarantine logic 225. (FIG. 3, circle 5.) The quarantine logic 225 searches the quarantine log 235 to determine whether the identifier of the DOCSIS CM/AP 130 that forwards the IP service request is present.

If the identifier of the DOCSIS CM/AP 130 that forwards the IP service request is present in the quarantine log 235, the processor 215 creates a redirect request. (FIG. 3, circle 6A.) The redirect request may include the DOCSIS CM/AP identifier and the ISD identifier. The processor 215 causes the redirect request to be sent to the quarantine IP alert server 180 via quarantine reason controller 175. (FIG. 3, circle 6B.)

If the identifier of the DOCSIS CM/AP 130 that forwards the IP service request is not present in the quarantine log 235, the processor 215 creates a response to the IP service request. (FIG. 3, circle 6C.) The processor 215 causes the response to the IP service request to be sent to the ISD from which the request originated via the DOCSIS CM/AP 130. (FIG. 3, circle 6D.)

Figure 4:
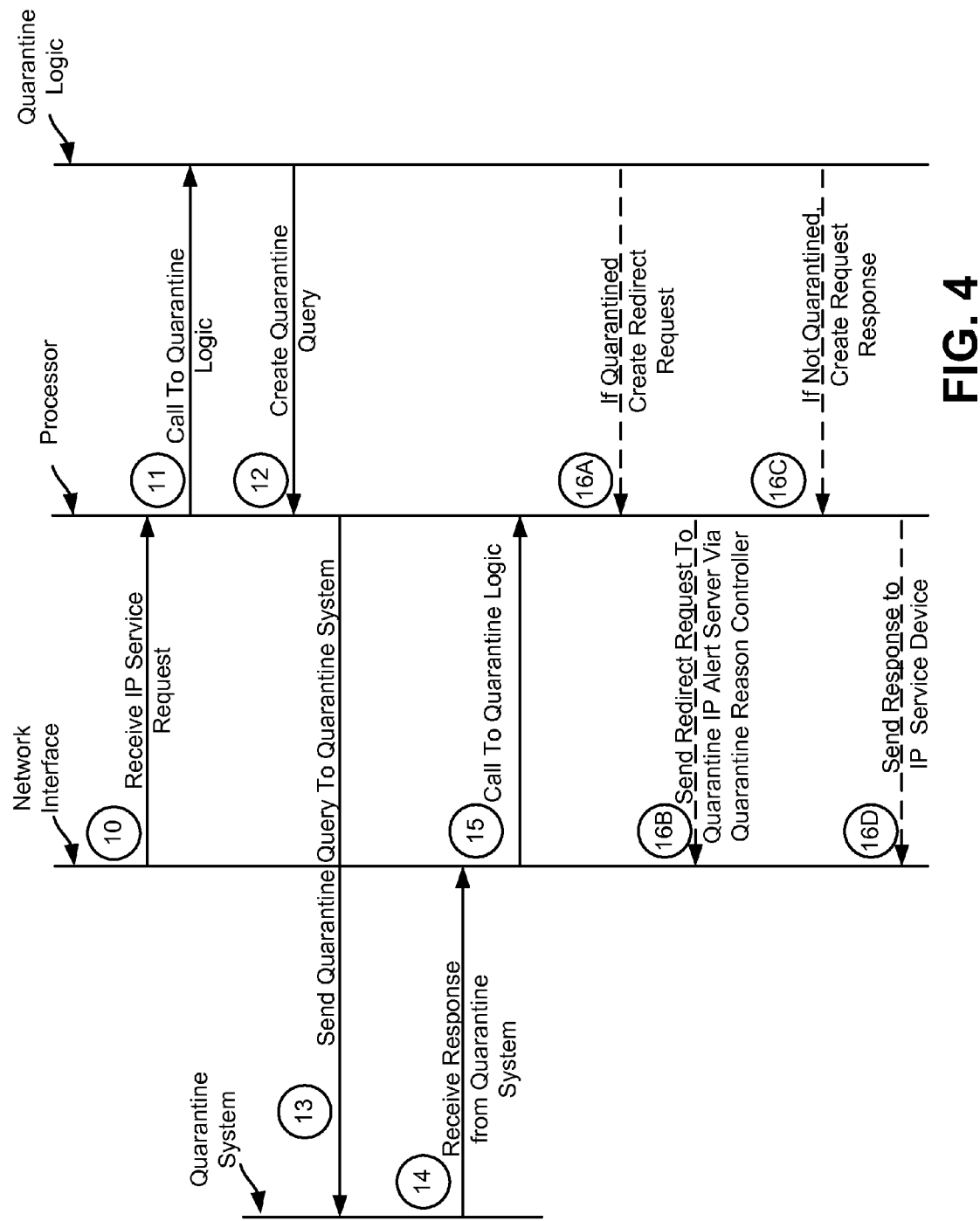
FIG. 4 is a flow diagram illustrating an alternative process by which an IP application server may identify a DOCSIS CM/AP that is subject to quarantine according to an embodiment.

FIG. 4 is a flow diagram illustrating an alternative process by which an IP application server may identify a DOCSIS CM/AP that is subject to quarantine according to an embodiment. In this embodiment, the IP application server 160 queries the quarantine system 165 for the quarantine status of the requesting ISD.

Referring to FIGS. 1, 2 and 4, an IP service request is received at the IP application server 160. (FIG. 4, circle 10.) The IP service request comprises an identifier that associates the subscriber to the DOCSIS CM/AP 130 that forwards the IP service request and an ISD identifier that identifies the ISD from which the request originated. By way of illustration and not by way of limitation, the DOCSIS CM/AP identifier may be the MAC address of the DOCSIS CM/AP 130, the IP address of the DOCSIS CM/AP 130, or may include both. The ISD identifier may be the MAC address of the ISD, the IP address of the ISD, or may include both.

The receipt of the IP service request causes the processor 215 to make a call to the quarantine logic 225. (FIG. 4, circle 11.) The quarantine logic 225 creates a quarantine query. (FIG. 4, circle 12.) In an embodiment, the quarantine query comprises the DOCSIS CM/AP identifier.

The quarantine query is sent to the quarantine system 165. (FIG. 4, circle 13.) The quarantine system 165 determines whether the DOCSIS CM/IP identifier of the DOCSIS CM/AP 130 that forwards the IP service request is present in the quarantine datastore 168. The quarantine system 165 sends a response to the IP application server 160. (FIG. 4, circle 13.)

The receipt of the response from the quarantine system 165 causes the processor 215 to make a call to the quarantine logic 225. (FIG. 4, circle 15.) If the response to the quarantine query indicates that the DOCSIS CM/AP 130 that forwards the IP service request is quarantined, the processor 215 creates a redirect request. (FIG. 4, circle 16A.) The redirect request may include the DOCSIS CM/AP identifier and the ISD identifier. The processor 215 causes the redirect request to be sent to the quarantine IP alert server 180 via quarantine reason controller 175. (FIG. 4, circle 16B.)

If the response to the quarantine query indicates that the DOCSIS CM/AP 130 that forwards the IP service request is not quarantined, the processor 215 creates a response to the IP service request. (FIG. 4, circle 16C.) The processor 215 causes the response to the IP service request to be sent to the IP service device from which the request originated via the DOCSIS CM/AP 130. (FIG. 4, circle 16D.)

In an embodiment, the redirect requests illustrated in FIGS. 3 and 4 and described above convey the DOCSIS CM/AP identifier and the ISD identifier to the quarantine reason controller 175. The quarantine reason controller 175 reports the DOCSIS CM/AP identifier and the ISD identifier along with a reason for the quarantine to the quarantine IP alert server 180. The quarantine IP alert server 180 issues an alert or alerts appropriate to the IP services that are being provided to the ISD and appropriate to the reason the CM/AP 130 was quarantined.

In an embodiment, the IP application server 160 provides video content to an ISD that is configured to receive and display IP-video content (such as handset 120 and IP STB 125). In this embodiment, when an ISD that is behind a quarantined CM/AP 130 requests video content, the quarantine IP alert server 180 provides video content to the requesting ISD. The video content, when displayed, may provide reasons for the quarantine to the user of the ISD. The video content may also offer information as to the actions necessary to lift the quarantine.

In an embodiment, the instructions for lifting the quarantine may include a list of options that may be selected by the user. The selection of an option directs the quarantine IP alert server 180 to direct particular video content to the requesting ISD on a particular logical "channel." In an embodiment, the channel is defined by a stream identifier and the ISD is instructed to receive packets that carry the stream identifier of the selected video content. In an embodiment, the video content may be provided on an interactive page that may permit the subscriber to pay a bill on-line.

In an embodiment, IP application services are provided by application servers to subscribers who have registered with those application servers. By way of illustration and not by way of limitation, IP service providers that may require registration may include IP voice, IP video and IP gaming.

The registration process may associate an application or client operating on a device with an application server and permits the registered entity to access the services and/or content offered by the application server. The entitlement of a user of the registered entity may vary according to policies established by the application server and enforced by the application server when the user requests services and/or content. For example, the policies of an IP video application server may be used to establish tiered services, prepaid services and promotional services.

Figure 5:
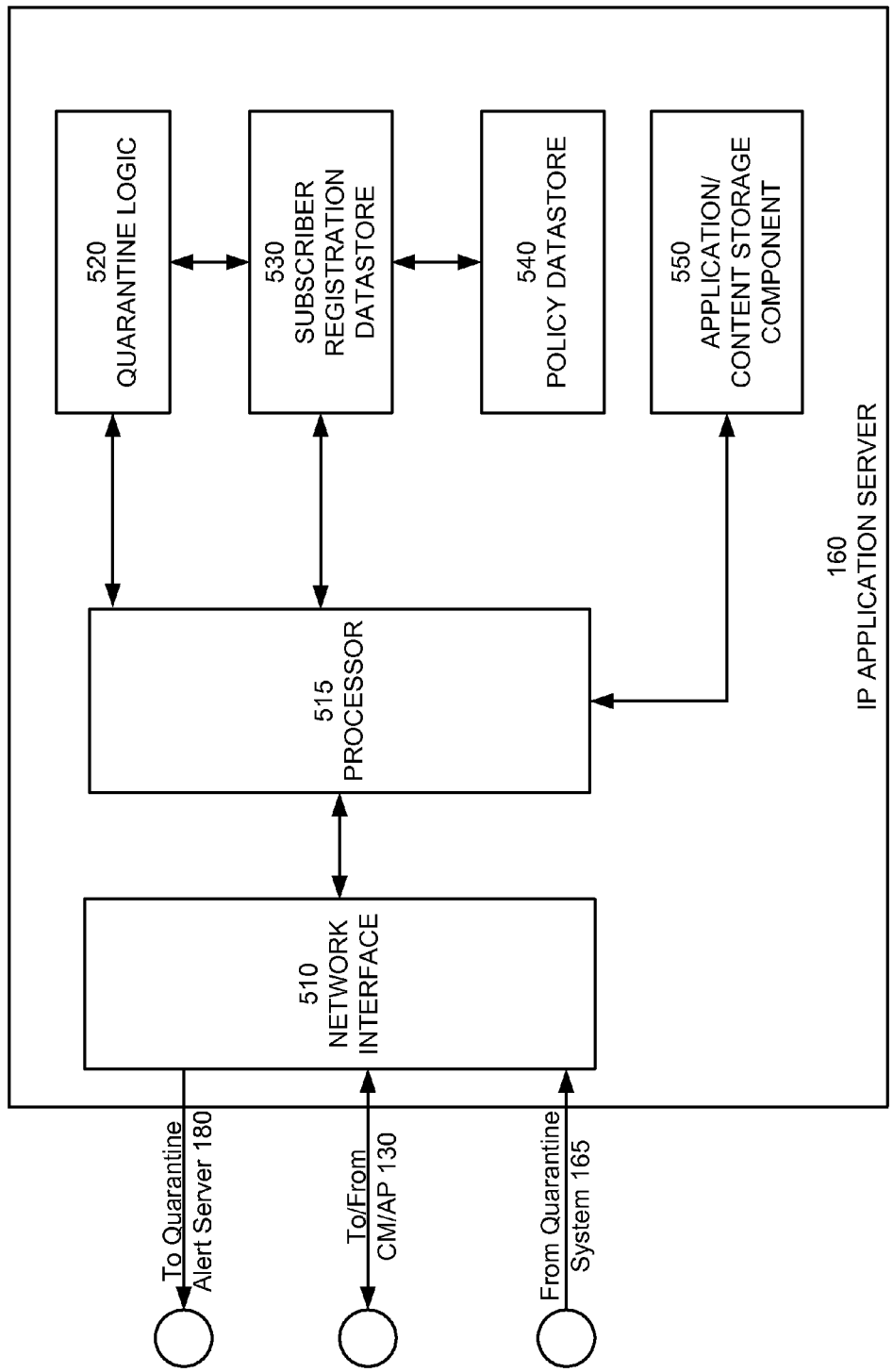
FIG. 5 is a block diagram illustrating components of an IP application server according to an embodiment.

FIG. 5 is a block diagram illustrating components of an IP application server according to an embodiment.

The IP application server 160 comprises a network interface 510, a processor 515, quarantine logic 520, a subscriber registration datastore 530, a policy datastore 540 and an application/content storage component 550. The application/content storage component comprises the applications run by the IP applications server 160 and/or the content that is served by IP applications server 160. The subscriber registration datastore 530 comprises subscriber data indicative of whether a particular subscriber is permitted to access and use the IP services provided by the IP application server 160. The subscriber registration datastore 530 is configured to set a flag when notified that the CM/AP 130 is quarantined and to remove the flag when notified that the quarantine is lifted. The policy datastore 540 associates a particular policy with a particular subscriber. The policy associated with a subscriber determines whether and how a request for services from the subscriber is addressed by the IP application server 160. The policy datastore may be used to apply a quarantine policy to a subscriber using a DOCSIS CM/AP 130 that has been quarantined.

Figure 6:
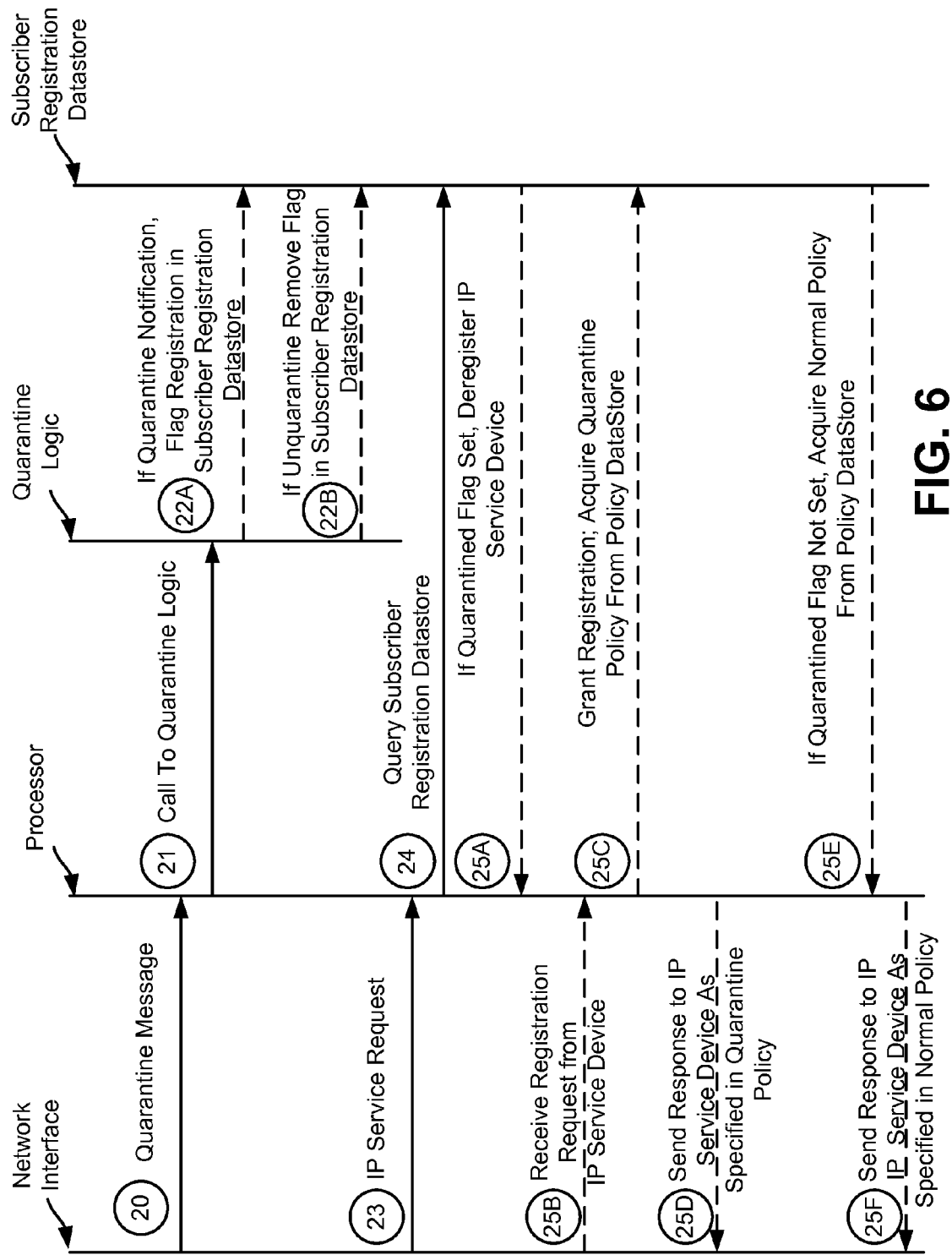
FIG. 6 is a flow diagram illustrating a process by which an IP application server may identify an IP service device that is subject to quarantine according to an embodiment.

FIG. 6 is a flow diagram illustrating a process by which an IP application server may identify an IP service device that is subject to quarantine according to an embodiment.

Referring to FIGS. 5 and 6, in an embodiment, when the DOCSIS CM/AP 130 has been quarantined or unquarantined by the quarantine system 165, the quarantine system 165 sends a quarantine status message to the IP application server 160. (FIG. 6, circle 20.) The quarantine status message is received at the network interface 510 and referred to the processor 515. The receipt of the quarantine status message causes the IP application server 160 to make a call to quarantine logic 520. (FIG. 6, circle 21.) The quarantine status message may include an identifier that associates a subscriber's DOCSIS CM/AP 130 that is the subject of the quarantine status message to an identifier identifying the subscriber as a registered recipient of services provided by the application server 160. The quarantine status message may also include a quarantine code.

In an embodiment, a registered subscriber to the application server 160 receives a host name that is unique within the domain of the service provider IP network (FIG. 1, 145). The host name may be associated with the MAC address of the CM/AP 130 used by the subscriber to access the application server 160 by the quarantine system 165.

In another embodiment, when a CM/AP 130 is quarantined, the quarantine system 165 performs a query of datastores accessible to the quarantine system to obtain subscriber information as required to determine whether the subscriber associated with the quarantined CM/AP 130 is also a registered user of IP applications provided by the application server 160 and/or other application servers (not illustrated). The query will also obtain the address of each application server to which the subscriber is registered and the subscriber's IP service identifier for each application server.

Alternatively, the information required to determine whether the subscriber associated with the quarantined CM/AP 130 is also a registered user of IP applications may be retained in a single datastore, accessible to the quarantine system 165, such as, for example, quarantine datastore 168.

The association of a subscriber's DOCSIS CM/AP 130 MAC address with an IP service identifier may be accomplished in a number of ways, including, for example, by associating a subscriber account with both the host name and the MAC address of the CM/AP 130. For example, the subscriber account number can be found by the quarantine system 165 via knowledge of the MAC address of the CM/AP 130 and the IP service identifier may be found with knowledge of the subscriber account number.

If the quarantine status message is a quarantine notification, the quarantine logic causes a quarantine flag to be written to the subscriber registration datastore 530. (FIG. 6, circle 22A.) The flag may indicate the quarantine code provided in the quarantine message.

If the quarantine status message is an unquarantine notification, the quarantine logic causes an existing flag to be erased. (FIG. 6, circle 22B.)

A cable modem (such as DOCSIS CM/AP 130) forwards an IP service request from an ISD to an IP application server 160. In an embodiment, the IP service request is received at the network interface 510 of IP application server 160 and is passed to the processor 515. (FIG. 6, circle 23.) The IP service request comprises an IP service identifier that identifies the ISD (FIG. 1, 110, 115, 120 and 125) to the IP application server 160 as a registered user of that server.

The receipt of the IP service request causes the processor 515 to query the subscriber registration datastore 530 to determine whether the IP service identifier forwarded in the IP service request matches an entry in the subscriber registration datastore 530 and, if so, whether a quarantine flag for that IP service identifier has been set (FIG. 6, circle 24.) If a quarantine flag is set, the IP service identifier is deleted and the ISD is "deregistered." (FIG. 6, circle 25A.) In response to the de-registration of the ISD, the ISD sends a registration request to the IP application server 160. (FIG. 6, circle 25B.) The processor 515 grants the registration request and acquires a quarantine policy from the policy datastore. (FIG. 6, circle 25C.) The processor 515 then sends a response the ISD as specified in the quarantine policy. (FIG. 6, circle 25D.)

If a quarantine flag is not set, the processor 515 acquires a "normal" policy from the policy datastore. (FIG. 6, circle 25E.) The processor 515 then sends a response the ISD as specified in the "normal" policy. (FIG. 6, circle 25F.)

By way of illustration, in an embodiment, the IP application server 160 provides digital telephone service (Voice over IP or VoIP) to an ISD (such as handset 120) that is configured to make phone calls. In this embodiment, the IP application server may comprise an IP voice server (not illustrated) that routes telephone calls within the service provider IP network 145 as well as calls that are directed off-network. In this embodiment, when a customer is placed in quarantine state, a configuration parameter (flag) is placed on the subscriber's record. An IP endpoint (such as handset 120) is deregistered from phone service by the IP voice server. When the IP endpoint attempts to reregister, a quarantine flag identifies the IP endpoint for a quarantine policy that defines the specific call handling policy for quarantined handsets. By way of illustration and not by way of limitation, when a call is being made (e.g., handset 120 goes "off-hook"), the IP voice server applies a call handling policy to redirect the call to special handling as determined by the network provider.

In an embodiment, the special handling involves playing an audio message (announcement.) The audio content may also offer information as to the actions necessary to lift the quarantine. In an embodiment, the instructions for lifting the quarantine are provided by an interactive voice response (IVR) system (not illustrated) accessible to the IP application server 160, as, for example, an IVR operating within the quarantine IP alert server 180. In this embodiment, a subscriber is provided a list of options from the IVR. An option may be selected by the user using a key or key combination on the handset. The selection of an option directs the IVR system to provide particular audio content to the requesting ISD.

In an embodiment, the quarantine policy may connect the caller to a customer service representative. In yet another embodiment, the quarantine policy may pass through emergency calls (911, local law enforcement, etc.) without respect to the quarantine status of the subscriber.

In the embodiments described above, the operator of a service provider network may enforce a quarantine of a subscriber who uses the service provider network by preventing a subscriber from accessing sites outside the service provider's network and by redirecting communications from the subscriber to specialized sites that are within the service provider's network. Thus, a subscriber who receives video IP, voice over IP or other third party services will be prevented from accessing these services.

In an embodiment, a third-party IP service provider (i.e., other than the IP network provider) may cooperate with the service provider to honor the special handling as specified by the service provider issuing the quarantine. In this embodiment, subject to an agreement between the IP network provider and the digital telephone service provider, calls may be allowed to bypass the quarantine (with respect to the digital telephone service only) and be delivered to the digital telephone service provider's network for call processing. Under this agreement, the digital telephone service provider would be required to honor the special call handling as determined by the network provider. A simple way to implement this would be for the IP network provider to create a toll-free number that the third-party digital telephone provider would use to forward quarantined customers' calls. This telephone number could be the number of customer service or a customer service menu (IVR). This would allow the subscriber to complete emergency calls and contact customer service while allowing the fastest possible resolution of the situation causing the quarantine.

In an embodiment, an ISD is subject to a "soft quarantine." In this embodiment, the IP service remains functional. However, the user of the IP service is required to view or hear a message before the service is provided. A software quarantine may be used to advise the user of maintenance, of a problem with a Web-based service, a change in a contract term, an approaching service termination date, and a health and safety message to name a few.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a processor. A general-purpose processor may be a microprocessor, but, in the alternative, the processor may be any conventional processor, controller, microcontroller, or state machine. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media include both computer storage media and communication media including any medium that facilitates transfer of a computer program from one place to another. Storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as cellular, infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically and discs reproduce data optically with lasers. Combinations of the above should also be included within the scope of computer-readable media. Additionally, the operations of a method or algorithm may reside as one or any combination or set of codes and/or instructions on a machine-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

What is claimed is:

1. A method for affecting the behavior of an IP service device (ISD) comprising:
   receiving an IP service request from the ISD at a network access device, wherein the network access device is connected to a network;
   forwarding by the network access device the IP service request to an IP application server accessible to the network, wherein the forwarded service request comprises an originating MAC address of the network access device;
   accessing by the IP application server a quarantine datastore, wherein the quarantine datastore comprises a quarantine status of a plurality of network access devices each of which is associated with a stored MAC address;
   determining by the IP application server the quarantine status of the ISD as quarantined when the originating MAC address of the network access device matches one of the plurality of stored MAC addresses; and
   determining by the IP application server the quarantine status of the ISD as not quarantined when the originating MAC address of the network access device does not match one of the plurality of stored MAC addresses;
   providing by the IP application server the requested IP service when the ISD is not subject to quarantine; and
   sending by the IP application server a quarantine message to the ISD when the ISD is subject to quarantine.

2. The method of claim 1, wherein the network access device is a modem.

3. The method of claim 1, wherein the ISD is selected from the group consisting of a desktop computer, a laptop computer, a telephone handset, and an IP set top box.

4. The method of claim 1, wherein the service request is selected from the group consisting of a request for video service and a request for telephone service.

5. The method of claim 4, wherein the quarantine message is an audio-video message.

6. The method of claim 4, wherein the quarantine message is an audio message.

7. The method of claim 1, wherein the quarantine message comprises at least one of an explanation of why the ISD is quarantined and an explanation of how to return the ISD to an unquarantined state.

8. The method of claim 1, wherein the location of the quarantine datastore is selected from the group consisting of in the IP application server and remote from and accessible to the IP application server via the network.

9. A system for affecting the behavior of an IP service device (ISD) comprising:
   a network;
   a quarantine datastore accessible from the network;
   a network access device connected to the network comprising a first processor; and
   an IP application server accessible via the network and comprising a second processor,
   wherein the first processor is configured with software executable instructions to cause the first processor to perform operations comprising:
      receiving an IP service request from the ISD; and
      forwarding the service request to the IP application server, wherein the forwarded service request comprises an originating MAC address of the network access device; and
   wherein the second processor is configured with software executable instructions to cause the second processor to perform operations comprising:
      accessing the quarantine datastore, wherein the quarantine datastore comprises a quarantine status of a plurality of network access devices each of which is associated with a stored MAC address;
      determining the quarantine status of the ISD as quarantined when the originating MAC address of the network access device matches one of the plurality of stored MAC addresses; and determining the quarantine status of the ISD as not quarantined when the originating MAC address of the network access device does not match one of the plurality of stored MAC addresses;
providing the requested IP service when the ISD is not subject to quarantine; and
sending the ISD a quarantine message when the ISD is subject to quarantine.

10. The system of claim 9, wherein the network access device is a modem.

11. The system of claim 9, wherein the ISD is selected from the group consisting of a desktop computer, a laptop computer, a telephone handset, and an IP set top box.

12. The system of claim 9, wherein the service request is selected from the group consisting of a request for video service and a request for telephone service.

13. The system of claim 12, wherein the quarantine message is an audio-video message.

14. The system of claim 12, wherein the quarantine message is an audio message.

15. The system of claim 9, wherein the quarantine message comprises at least one of an explanation of why the ISD is quarantined and an explanation of how to return the ISD to an unquarantined state.

16. The system of claim 9, wherein the location of the quarantine datastore is selected from the group consisting of in the IP application server and remote from and accessible to the IP application server via the network.

17. A method for affecting the behavior of an IP service device (ISD) comprising:
receiving a service request from the ISD at a network access device;
forwarding by the network access device the service request to an IP application server accessible to the network, wherein the service request comprises an IP service identifier that identifies the ISD as a registered user of the IP application server;
accessing by the IP application server a subscriber registration datastore, wherein the subscriber registration datastore comprises a record of each ISD that is registered with the IP application server, wherein each record comprises a stored IP service identifier of the ISD to which the record pertains;
determining by the IP application server the quarantine status of the ISD as quarantined when the IP service identifier forwarded in the request matches the stored IP service identifier of one of the plurality of stored records having a quarantine flag;
determining by the IP application server the quarantine status of the ISD as not quarantined when the IP service identifier forwarded in the request does not match the stored IP service identifier of one of the plurality of stored records having the quarantine flag;
deregistering by the IP application server the ISD as a registered user of the IP application server when the quarantine status is quarantined;
re-registering by the IP application server the ISD as a quarantined registered user of the IP application server;
associating by the IP application server the IP service identifier of the quarantined registered user with a quarantine service policy; and
providing services by the IP application server to the quarantined registered user in accordance with the quarantine service policy.

18. The method of claim 17, wherein the network access device is a modem.

19. The method of claim 17, wherein the ISD is selected from the group consisting of a desktop computer, a laptop computer, a telephone handset, and an IP set top box.

20. The method of claim 17, wherein the service request is selected from the group consisting of a request for video service and a request for telephone service.

21. The method of claim 17, wherein providing services to the quarantined registered user in accordance with the quarantine service policy comprises responding to the service request with a message selected from the group consisting of an audio-video message and an audio message.

22. The method of claim 21, wherein the message comprises at least one of an explanation of why the ISD is quarantined and an explanation of how to return the ISD to an unquarantined state.

23. A system for affecting the behavior of an IP service device (ISD) comprising:
a network;
a subscriber registration datastore accessible from the network;
a network access device connected to the network comprising a first processor; and
an IP application server accessible via the network and comprising a second processor,
wherein the first processor is configured with software executable instructions to cause the first processor to perform operations comprising:
receiving a service request from the ISD;
forwarding the service request to an IP application server accessible to the network, wherein the service request comprises an IP service identifier that identifies the ISD as a registered user of the IP application server;
wherein the second processor is configured with software executable instructions to cause the IP application server to perform operations comprising:
accessing a subscriber registration datastore, wherein the subscriber registration datastore comprises a record of each ISD that is registered with the IP application server, wherein each record comprises a stored IP service identifier of the ISD to which the record pertains;
determining the quarantine status of the ISD as quarantined when the IP service identifier forwarded in the request matches the stored IP service identifier of one of the plurality of stored records having a quarantine flag;
determining the quarantine status of the ISD as not quarantined when the IP service identifier forwarded in the request does not match the stored IP service identifier of one of the plurality of stored records having the quarantine flag;
deregistering the ISD as a registered user of the IP application server when the quarantine status is quarantined;
re-registering the ISD as a quarantined registered user of the IP application server;
associating the IP service identifier of the quarantined registered user with a quarantine service policy; and
providing services to the quarantined registered user in accordance with the quarantine service policy.

24. The system of claim 23, wherein the network access device is a modem.

25. The system of claim 23, wherein the ISD is selected from the group consisting of a desktop computer, a laptop computer, a telephone handset, and an IP set top box.

26. The system of claim 23, wherein the service request is selected from the group consisting of a request for video service and a request for telephone service.

27. The system of claim 23, wherein the operation of providing services to the quarantined registered user consistent with the quarantine service policy comprises responding to the service request with a message selected from the group consisting of an audio-video message and an audio message.

28. The system of claim 27, wherein the message comprises at least one of an explanation of why the ISD is quarantined and an explanation of how to return the ISD to an unquarantined state.

* * * * *

UNITED STATES PATENT AND TRADEMARK OFFICE
CERTIFICATE OF CORRECTION

| | | |
|---|---|---|
| PATENT NO. | : 8,683,038 B2 | Page 1 of 1 |
| APPLICATION NO. | : 12/692957 | |
| DATED | : March 25, 2014 | |
| INVENTOR(S) | : John Anthony Chen et al. | |

It is certified that error appears in the above-identified patent and that said Letters Patent is hereby corrected as shown below:

In the title page, item (73) Assignee

Please delete "Time Warner Cable, Inc." and insert --Time Warner Cable Enterprises LLC--

Signed and Sealed this
Fifth Day of May, 2015

Michelle K. Lee
*Director of the United States Patent and Trademark Office*